United States Patent [19]

Canterberry et al.

[11] Patent Number: 4,923,536
[45] Date of Patent: * May 8, 1990

[54] EXPLOSIVES AND PROPELLANT COMPOSITIONS CONTAINING A POLYURETHANE POLYACETAL ELASTOMER BINDER AND METHOD FOR THE PREPARATION THEREOF

[75] Inventors: J. B. Canterberry, Crawfordville, Fla.; Lawrence E. Katz, Orange, Conn.

[73] Assignee: Olin Corporation, Cheshire, Conn.

[*] Notice: The portion of the term of this patent subsequent to Feb. 28, 2006 has been disclaimed.

[21] Appl. No.: 156,695

[22] Filed: Feb. 17, 1988

[51] Int. Cl.$^5$ ............................................. C06B 45/10
[52] U.S. Cl. ..................................... 149/19.4; 149/19.6
[58] Field of Search .............................. 149/19.4, 19.6

[56] References Cited

U.S. PATENT DOCUMENTS

| | | | |
|---|---|---|---|
| 4,128,996 | 12/1978 | Garner et al. | 149/19.6 |
| 4,456,493 | 6/1984 | Barnes et al. | 149/19.4 |
| 4,650,617 | 3/1987 | Kristofferson et al. | 149/19.4 |
| 4,726,919 | 2/1988 | Kristofferson et al. | 149/19.4 |
| 4,799,980 | 1/1989 | Reed | 149/19.4 |
| 4,808,689 | 2/1989 | Katz | 528/48 |

OTHER PUBLICATIONS

Okada, Masahiko, Mita, Koji, and Jiroshi Sumitomo, "Polymerizability of Methyl Substituted 1,3-Dioxolanes," Die Makromolekulare Chemie, 176, pp. 859–872 (1975).

Wise, S., and J. J. Rocchio, "Binder Requirements for Low Vulnerability Propellants," 18th Jannaf Combustion Meeting, vol. II, CPIA Publication 347, Oct., 1981, Jet Propulsion Laboratory, Pasadena, California, Oct. 19–23, 1981, pp. 305–320.

Chien, J. C. W., Farris, R., Lillya, C. P., Winter, H., and L. C. Dickinson, "Molecular Design of Thermoplastic Elastomeric LOVA Binder", University of Massachusetts, Amherst, MA, *ONR Workshop on Energetic Polymer and Processing Science*, CPIA Publication 405, Jun. 1984, Jul. 25–27, 1983, pp. 119–129.

J. C. W. Chien, "Synthesis of Polyacetal-Polyurethane Thermoplastic Elastomers As LOVA-Binders", University of Massachusetts, Amherst, MA, *ONR Workshop on Energetic Polymer and Processing Science*, CPIA Publication 405, Jun. 1984, Jul. 25–27, 1983, pp. 131–139.

Baobei Xu, D. N. Khanna, C. Peter Lillya, and James C. W. Chien, "Structure-Property Relationships in Thermoplastic Elastomers III, Segmented Polyacetal-Polyurethanes", *Journal of Applied Polymer Science*, vol. 31, pp. 123–133 (1986).

Peters, S. T., Baroody, E. E., Boswell, R. F., Tompa, A. S., "Characterization of Thermoplastic Elastomers for Use in Gun Propellants", *Proceedings of the American Defense Preparedness Association, Chemical & Plastics Section of Chemical Division*, Oct. 27–29, 1986, pp. 8–15.

Diab, M. A., Hseih, D. T., Lillya, C. P., and J. C. W. Chien, "Acidolysis of Poly-(4-methyl-1,3-dioxolane)," Journal of Polymer Science: Part A: Polymer Chemistry, vol. 25, pp. 945–954 (1987).

"Memorandum for Secretary, Joint Chiefs of Staff-Subject: Insensitive Munitions Joint Requirement", Jun. 30, 1987, signed by J. R. Sculley, Assistant Secretary of the Army.

*Primary Examiner*—Edward A. Miller
*Attorney, Agent, or Firm*—Dale L. Carlson

[57] ABSTRACT

A high energy explosive or propellant composition having low vulnerability to unplanned stimuli and containing a polyurethane polyacetal elastomer binder. Also claimed is a process for producing this composition.

22 Claims, No Drawings

EXPLOSIVES AND PROPELLANT COMPOSITIONS CONTAINING A POLYURETHANE POLYACETAL ELASTOMER BINDER AND METHOD FOR THE PREPARATION THEREOF

FIELD OF THE INVENTION

The present invention relates generally to a high energy explosive or propellant composition having low vulnerability to reaction to unplanned stimuli. Also claimed is a process for producing this composition.

BACKGROUND OF THE INVENTION

During the course of the last decade, the problem of unwanted detonation of high energy explosives and propellants for weaponry and rockets has been a major concern to the military. In an effort to increase propellant/explosive survivability and reduce the threat of unplanned stimuli, such as the risk of unwanted detonation, various attempts have been made to incorporate elastomeric binders into the high energy explosive material to produce low vulnerability (so-called "LOVA") propellants/explosives. The binders studied include, for example, thermoplastic and thermosetting polyethers, acrylates and cellulose derivatives. General background information on the testing of these types of materials, as well as a general discourse on the desired binder characteristics for LOVA propellants is given in a technical paper by S. Wise and J. J. Rocchio entitled "Binder Requirements for Low Vulnerability Propellants", presented at the 18th JANNAF Combustion Meeting, Volume II at the Jet Propulsion Laboratory in Pasadena, California on Oct. 19 to 23, 1981, and reproduced in CPIA publication 347, Chemical Propulsion Information Agency, pp. 305-319, (October, 1981).

Desired binder characteristics include thermal stability against decomposition at a high temperature of at least about 180° C., processability by melt methods at temperatures below about 100° C., a low glass transition temperature of less than about −65° C., and the ability to depolymerize endothermically when exposed to the acidic decomposition products of energetic materials in propellants and explosives. In addition, there are several other preferred characteristics of binders, including the ability to maintain desired physical properties, including the above binder characteristics, even when loaded with up to 80 percent or higher of energetic additives, as well as the ability ideally to avoid phase changes over a temperature range of between about −60° C. and about 60° C., the ability to maintain binder integrity during elongation of up to 400 percent, and the ability to provide a high oxygen content and thereby assist in ignition of the explosive's or propellant's high energy component.

Recent technical papers on LOVA binders were presented at the "ONR Workshop on Energetic Polymer and Processing Science" given in Chestertown, Maryland on July 25-27, 1983 and reproduced in CPIA Publication 405, Chemical Propulsion Information Agency (June, 1984). In a paper reproduced at pages 131-139 of CPIA Publication 405, J. C. W. Chien generally describes the "Synthesis of Polyacetal-Polyurethane Thermoplastic Elastomers as LOVA Binders" by end capping methylene(bisphenyl)isocyanate (MDI) or toluene diisocyanate (TDI) to form a prepolymer, and then chain extending this prepolymer with a monomer which is either bis(2-hydroxyethyl) terephthalamide or bis-(2-hydroxyethyl-isophthalamide). The testing of these types of polyurethane polyacetals formed by reacting an isocyanate-terminated prepolymer with a monomer is disclosed in an article by S. T. Peters et al entitled "Characterization of Thermoplastic Elastomers for Use in Gun Propellants" from *Proceedings of the American Defense Preparedness Association; Chemical & Plastics Section of the Chemical Systems Division*, held Oct. 27-29, 1986, Long Beach, Calif., pp. 8-15. Table I at page 12 of this article discloses, in Samples 17 through 22 of the table, physical property data on these types of polymers. These samples show thermal stability, when loaded with 50 percent of RDX in a binder/propellant formulation, up to a decomposition temperature peak of between 191° C. and 210° C., as compared to the decomposition temperature of RDX alone of 220° C.. This difference in decomposition temperature between the pure RDX and the RDX/binder mixtures indicates some interaction between RDX and these binders, believed to be an undesirable effect.

This S. T. Peters et al article also discloses in TABLE I, samples 21 and 22, the testing of two polyacetal polyurethane elastomers of another type. This other type is apparently fabricated by reacting an isocyanate-terminated prepolymer, made using either TDI or MDI as the isocyanate component of the prepolymer, with a polyurethane and chain extended with N,N'(bis-2-hydroxyethyl) isophthalamide. These two samples are described in this article as exhibiting undesirable decomposition temperature peaks of 191° C. and 195° C., respectively, in admixture with a 50 percent loading of RDX. In addition, these two polymers are disclosed as having poor processability characteristics due to unacceptably high viscosities and high melting points.

In view of the above, it should be readily apparent that new explosive and propellant compositions containing improved polyurethane polyacetal elastomer binders and characterized by improved battlefield survivability would be highly desired by the military, particularly the propellant and explosive communities. Heretofore, such LOVA compositions and a method for their preparation were not known to the knowledge of the present inventor(s).

SUMMARY OF THE INVENTION

In one aspect, the present invention relates to an explosive or propellant composition characterized by low vulnerability to unplanned stimuli, said composition comprising between 51 and 99 weight percent of a high energy material (preferably selected from the group consisting of RDX, HMX, TAGN, NTO, and combinations thereof) and between 1 and 50 weight percent of a binder, said binder being a polyurethane polyacetal elastomer made by a process of:

(a) reacting a dihydroxy-terminated polyacetal homopolymer with an alkylene diisocyanate in the presence of a urethane-forming catalyst in a reaction L to produce an isocyanate-terminated prepolymer, said homopolymer having a weight average molecular weight of between about 5,000 and about 60,000 as measured against a polystyrene standard by gel permeation chromatography and being produced by polymerizing a 4-lower alkyl substituted-1,3-dioxolane, said reaction employing between about 50 mole percent and about 70 mole percent of said alkylene diiscocyanate based upon the total amount of said alkylene diisocyanate and said homopolymer employed, and (b) reacting said isocyanate-terminated prepolymer with a dihydroxy-terminated polyacetal copolymer in the presence of a solvent and a urethane-forming catalyst to provide said elastomer, said copolymer having a weight average molecular weight of between about 10,000 and about 200,000 as measured against a polystyrene standard by gel permeation chromatography and being the reaction product of a formaldehydeproviding compound and 1,3-dioxolane, said copolymer being employed in an amount of between about 30 and about 50 mole percent based upon the total amount of said copolymer and said isocyanate-terminated prepolymer employed.

In another aspect, the present invention relates to an explosive or propellant composition characterized by low vulnerability to unwanted detonation, said composition comprising between 51 and 99 weight percent of a high energy material and between 1 and 50 weight percent of a binder, said binder being a polyurethane polyacetal elastomer made by a process of:

(a) reacting a dihydroxy-terminated polyacetal copolymer with an alkylene diisocyanate in the presence of a urethane-forming catalyst in a reaction to produce an isocyanate-terminated prepolymer, said copolymer having a weight average molecular weight of between about 10,000 and about 200,000 as measured against a polystyrene standard by gel permeation chromatography and being the reaction product of a formaldehyde-providing compound and 1,3-dioxolane, said reaction employing between about 50 mole percent and about 70 mole percent of said alkylene diisocyanate based upon the total amount of said alkylene diisocyanate and said copolymer employed, and (b) reacting said isocyanate-terminated prepolymer with a dihydroxy-terminated polyacetal homopolymer in the presence of a solvent and a urethane-forming catalyst to provide said elastomer, said homopolymer having a weight average molecular weight of between about 5,000 and about 60,000, as measured against a polystyrene standard by gel permeation chromatography and being produced by polymerizing a 4-lower alkyl substituted-1,3-dioxolane, said homopolymer being employed in an amount of between about 30 and about 50 mole percent based upon the total amount of said homopolymer and said isocyanate-terminated prepolymer employed.

In yet another aspect, the present invention relates to a process for producing the above composition which comprises admixing the high energy material with the elastomer by a technique selected from the group consisting of solution casting, extrusion and graining into a ball powder.

The composition preferably has a decomposition temperature peak of within about 20° C. (more preferably within about 5° C.) of the decomposition temperature of said high energy material.

In another aspect, the present invention relates to a process for producing the above composition.

DETAILED DESCRIPTION OF THE INVENTION

It has now been surprisingly discovered in accordance with the present invention that novel LOVA explosive or propellant compositions can be made by combining a high energy material with a select polyurethane polyacetal elastomer. The resulting composition is characterized by a suitably low glass transition temperature (preferably of −40° C. or less), a desirable melting point (preferably of between about 90° C. and about 100° C.), and a suitably high peak decomposition temperature (preferably at least about 180° C. or higher).

The compositions undergo no phase changes between about −45° C. and about 80° C. as determined by Differential Scanning Calorimetry, have a built-in positive oxygen balance for supporting complete self-combustion, and are clean burning, thereby reducing or eliminating any smoke trail or trace during the ignition of the propellant or explosive, an advantage for solid rocket propellants.

The high energy material useful in the present invention is preferably one of the following high energy materials: RDX, NTO, TNT, HMX, TAGN, nitroguanidine or ammonium nitrate. Also, energetic plasticizers can be used such as diethylene glycol dinitrate, butane triol trinitrate, trimetriol trinitrate, or 2(2,4-dinitrophenoxy)ethanol.

In the first step of the process of making the elastomer useful in the present invention, a dihydroxy-terminated polyacetal homopolymer (the so-called "soft segment" moiety) is reacted with an alkyldiisocyanate to provide an isocyanate-terminated prepolymer. This isocyanate-terminated prepolymer preferably contains an average of between two and five (more preferably between two and four) molecules of polyacetal homopolymer and an average of between three and five molecules of diisocyanate, per molecule of prepolymer.

In the second step the isocyanate-terminated prepolymer is reacted with a dihydroxy-terminated polyacetal copolymer (the so-called "hard segment" moiety).

Although not wishing to be bound by any particular theory, it is believed by the present inventor(s) that the excellent physical properties of the elastomers useful in the present invention are attributable, at least in part, to the nature of the isocyanate utilized. Unlike the arylene isocyanates, such as MDI or TDI, disclosed in the prior art methods of producing polyurethane polyacetal elastomers, the present process utilizes an alkyldiisocyanate. The alkyldiisocyanate provides the advantage of enhanced elasticity to the elastomer as compared to the elasticity provided by TDI or MDI.

The alkyldiisocyanates useful in the present invention include alkyl, cycloalkyl, and alkylcycloalkyl diisocyanates. Illustrative alkyldiisocyanates can be represented by the empirical formula:

R(NCO)₂ wherein R is a divalent aliphatic group having between 2 and 20 carbon atoms; a divalent cycloalkyl group having between 3 and 9 carbon atoms; or a divalent alkylcycloalkyl having between 5 and 20 carbon atoms. Typical examples of suitable organic diisocyanates include aliphatic diisocyanates such as: ethylene, trimethylene, tetramethylene, pentamethylene, hexamethylene, heptamethylene, up to icosamethylene; 1,2-propylene, 1,3-butylene, 2,3-butylene, 1,3-butylene, ethylidine, and butylidine diisocyanates; cycloalkylene diisocyanates such as 1,3-cyclopentene, 1,4-cyclohexene, 1,2-cyclohexene diisocyanate; cycloalkane diisocyanates such as cyclopentyl, cyclohexyl, and cycloheptyl diisocyanate; alkylcycloalkyl diisocyanates such as methylcyclopentyl, methylcyclohexyl, dimethylcyclohexyl, isophorone diisocyanate. The preferred isocyanate is hexamethylene diisocyanate.

The polyacetal homopolymer soft segment of the elastomer can be prepared by known reactions. In accordance with a preferred reaction, a 4-lower alkyl substituted-1,3-dioxolane (preferably 4-methyl-1,3-dioxolane) is reacted with boron trifluoride etherate at a reaction temperature of between about −10° C. and about −20° C., preferably between about −15° C. and about −20° C., for a reaction time of at least about 8 hours, preferably at least 16 hours, although the reaction can take as long as 70 hours or longer depending upon the specific reactants and reactor conditions. The reaction is then quenched, and the resulting product is washed, hydrolyzed, and dried to provide the desired polyacetal homopolymer. This type of reaction is described in further detail in a technical article by M. Okada et al entitled "Polymerizability of Methyl Substituted 1,3-Dioxolanes" appearing in Die Makromolecular Chemie, Vol. 176, pp. 859–872 (1975), incorporated herein by reference. The hydrolysis step serves to cleave any hemiacetal terminal groups and replace them with alcohol groups (which are more reactive). The desired homopolymer generally has a weight average molecular weight of between about 5,000 and about 60,000 (preferably between about 10,000 and about 50,000, more preferably between about 20,000 and about 40,000) as measured by gel permeation chromatography against a polystyrene standard.

An alternate (and less preferred) preparation of the polyacetal homopolymer involves the reaction of the 4-lower alkyl substituted (e.g., 4-methyl or 4-ethyl substituted) with trifluoromethanesulfonic acid at about −78° C. for at least about two days, followed by reaction quenching, hydrolysis, washing, and drying of the product. The very low temperature of this reaction makes it commercially impractical.

The polyacetal copolymer useful in the present invention is the reaction product of 1,3-dioxolane with a formaldehyde-providing compound. Representative formaldehyde-providing compounds include, for example, trioxane, formaldehyde, paraformaldehyde, and combinations thereof. This reaction is generally conducted at between about 20° C. and about 70° C., preferably between about 25° C. and about 50° C., for up to a day or more, preferably between about 3 and about 24 hours to provide the desired copolymer. This reaction is described in more detail in a technical article by M. Inoue entitled "Crystallization and Melting of Copolymers" appearing in *Journal of Applied Polymer Science*, Vol. 8, pp. 2225–2238 (1964), incorporated herein by reference. The desired copolymer generally has a weight average molecular weight of between about 10,000 and about 200,000 (preferably between about 40,000 and about 150,000, more preferably between about 50,000 and about 140,000) as measured by gel permeation chromatography against a polystyrene standard.

The production of the polyurethane polyacetal elastomer is carried out by one of the processes (refer to steps (a) and (b))described earlier. Steps (a) and (b) can either be carried out in a stepwise manner or essentially simultaneously in an in situ reaction. The preferred process involves the reaction in the first step of the dihydroxy-terminated polyacetal homopolymer with alkyldiisocyanate to form an isocyanate-terminated prepolymer, followed by a reaction in the second step of this isocyanate-terminated prepolymer with the dihydroxy-terminated polyacetal copolymer to provide the desired polyurethane polyacetal elastomer. Each step of this two step reaction is generally carried out at a reaction temperature independently selected to be between about 25° C. and about 100° C., preferably between about 60° C. and about 70° C. The first reaction step is preferably carried out in the presence of a solvent, preferably a halohydrocarbon solvent, and the second reaction step is generally also conducted in the presence of a solvent, conveniently also a halohydrocarbon solvent. Typical solvents would include tetrachloroethane, methylene chloride, chloroform, and trichloroethane. The preferred solvent is chloroform. Other useful solvents would include non-reactive organics in which the reactants are soluble.

Each reaction in the two step process of preparing the elastomer is conducted in the presence of a urethane-forming catalyst, such as dibutyltin dilaurate, dibutyltin dithiolaurate, tertiary amines, uranyl acetate, triphenylbismuth/maleic anhydride, and the like. The preferred catalyst is dibutyltin dilaurate.

Each reaction in the two step process of preparing the elastomer is preferably conducted with stirring in an inert reactor such as a stainless steel or glass lined reactor. Each reaction is conducted over a period of at least about four hours, preferably at least about eight hours.

In an alternative (and less preferred) process for making the elastomer, the dihydroxy-terminated polyacetal copolymer is first reacted with the alkyldiisocyanate to form an isocyanate-terminated prepolymer, and this prepolymer is reacted with the dihydroxy-terminated polyacetal homopolymer to provide a polyurethane polyacetal elastomer. This isocyanate-terminated prepolymer preferably contains an average of between two and five (more preferably between two and four) molecules of polyacetal copolymer and an average of between three and five molecules of diisocyanate. This less preferred process provides an elastomer having a hard segment center and soft segment terminal groups.

In the process of making the composition of the present invention by combining the high energy material with the elastomer binder, any suitable technique may be employed. For example, solution casting from a solvent or extrusion may be employed.

Alternatively, the composition can be grained into a ball powder following well-established procedures. Such a graining technique is discussed, for example, at Volume 9, pages 645 through 651 of Kirk-Othmer "Encyclopedia of Chemical Technology" (Third Edition, 1980).

The following examples are intended to illustrate, but in no way limit the scope of, the present invention.

EXAMPLE 1

(I) Preparation of 4-Methyl-1,3-Dioxolane (Starting Material for the Polyacetal Homopolymer)

To a one liter flask was added 25.0 g Dowex 50X-8-200 (air dried), 228.0 g (3.0 moles) 1,2-propanediol and 60.0 g (2.0 moles) paraformaldehyde. The mixture was heated and stirred at 100° to 110° C. while collecting distillate. As the reaction progressed, portions of 152.0 g (2.0 mole) 1,2-propane diol and 60.0 g (2.0 mole) paraformaldehyde were added as needed to keep the product distilling. After addition of ten 2 molar portions, the product was separated from co-distilled water, dried over potassium hydroxide, and refluxed with sodium. The product was distilled at 85° to 88° C. to provide the titled product in a 70 mole percent yield.

(II) Preparation of Poly-4-Methyl-1,3-Dioxolane (a Polyacetal Homopolymer)

(a) Less Preferred Method

To 559.8 g (6.35 mole) 4-methyl-1,3-dioxolane, cooled to 3° C., was added 12.0 g (0.08 mole) trifluoromethane sulfonic acid and the solution stirred. The solution was decanted into test tubes, capped, and cooled at −78° C. for two days. A quench solution was made from 1680 ml toluene, 105 ml water, 15.4 g trimethylamine hydrochloride, and 18.1 potassium hydroxide. The aqueous layer was phased off and the solution cooled in an ice bath. To this was added the cold test tubes (cracked) with vigorous stirring. After 1 and ½ hours the solution was filtered, an aqueous solution of 5 percent potassium hydroxide added, and the solution boiled. The aqueous layer was separated and the toluene solution washed with five ½ liter portions of water each time bringing it to a boil. Excess water was azeotroped off and toluene removed via rotary evaporation under aspiration. A yield of 379.5 g residue which was dried at 110° C. under vacuum to give 376.8 g (67.3 percent) polymer.

The polymer was characterized via Gel Permeation Chromatography, which showed it had a molecular weight of 35,291 versus a polystyrene standard (using a linear ULTRASTRYAGEL column and chloroform as a solvent).

(b) More Preferred Method

To 352.7 g (4.0 mole) 4-methyl-1,3-dioxolane, cooled to 0° C. under nitrogen was added 5.16 g (0.036 mole) boron trifluoride etherate with stirring. The flask was capped and stored in a freezer (−16° C.) for 68.5 hours. A quench solution was prepared by mixing 6.89 g (0.072 mole) trimethylamine hydrochloride in 50 ml of water, 500 ml methylene chloride at ∼0° C. and adding 4.0 g (0.071 mole) potassium hydroxide. The quench solution was phased and the methylene chloride layer stirred at ∼0° C. while adding the polymer reaction mixture. The reaction vessel was rinsed with three 100 ml portions of methylene chloride which were added to the other solution. The combined solution was washed with four 500 ml portions of water, phased, and rotary evaporated. The residue was taken up in 500 ml toluene, 500 ml of one percent potassium hydroxide was added, and the mixture was refluxed for one hour. The mixture was phased, the toluene solution washed with several portions of water, and water azeotroped off. Rotary evaporation of the toluene yielded 171.5 g (48.6 percent) of polymer.

(III) Preparation of Trioxane/1,3-Dioxolane (a Polyacetal Co-Polymer)

In a 4 liter flask 250.0 g (2.78 mole) trioxane, 308.7 g (4.17 mole) 1,3-dioxolane and 500 ml cyclohexane was stirred. The mixture was cooled to 7° C. and 9.80 g (0.07 mole) boron trifluoride etherate added. After about ¼ hour the reaction set up and was allowed to stand overnight. To this was added 250 ml triethylamine and the gummy mass allowed to stand two hours and stirred ½ hour. The amine was decanted, 700 ml methanol added, and the mixture stirred. The methanol was removed via filterstick and the methanol wash process repeated. To the mixture was added 175 ml triethylamine, 350 ml ethanol, and 2500 ml water. The mixture was refluxed for four hours and stirred while cooling to room temperature. After standing overnight, the solution was decanted and the gummy residue washed with 700 ml portions of methanol. The solid was filtered, washed with methanol and dried under vacuum at 60° C. to give 333.4 g (59.6 percent) polymer.

A portion of this was fractionated from methylene chloride to give about an 80 percent recovery of polymer. Gel Permeation Chromatography showed a molecular weight of 138,701 versus a polystyrene standard (using a linear ULTRASTRYAGEL column and chloroform as a solvent).

(IV) Preparation of Polyurethane Polyacetal Elastomer

In a 100 ml resin kettle, equipped with a mechanical stirrer, was placed 47.1 g (0.0097 mole) poly-4-methyl-1,3-dioxolane, 2.50 g (0.0149 mole) 1,6-diisocyanatohexane, and 102 g of 1,1,2,2-tetrachloroethane. The solution was stirred with heating at 64° C. and 0.22 g (0.00035 mole) dibutyltin dilaurate added.

After 10.8 hours this solution was poured into a previously made solution of 18.5 g (0.0049 mole) trioxane/1,3-dioxolane copolymer and 37.2 g of 1,1,2,2-tetrachloroethane (at 65° C.). The combined solutions were stirred at 65° C. for two days, then 0.10 g (0.00016 mole) dibutyltin dilaurate was added and the reaction was continued for an additional day. Petroleum ether was added to the reaction mixture and the solvent layer decanted away from the polymer. After washing with more petroleum ether, the process was repeated and the polymer dried at 50° C. under vacuum (0.1 mm) several days. A yield of 57.6 g was obtained. Gel Permeation Chromatography of the polymer showed a weight average molecular weight of 166,783 versus a polystyrene standard using a linear ULTRASTRYAGEL column and chloroform as a solvent. Note that this molecular weight is a weight average using a specific (polystyrene) GPC standard and cannot necessarily be calculated by merely adding the GPC standard molecular weights of the component segments comprising the elastomer. The NMR (proton), run in deuterated chloroform, indicated between three and four soft segments per hard segment. Differential Scanning Calorimetry (DSC) showed a glass transition point about −45° C. and a melting point at 86.5° C. (run under inert atmosphere). This melting point is considered ideally suited for extrusion melt processing in contrast to typical prior art polyurethane polyacetal binders having much higher melting points.

(V) Preparation of Propellant Composition

A propellant composition containing 80 weight percent of RDX and 20 weight percent of the polyurethane polyacetal elastomer identified in Section (IV) of this example was prepared by solution casting. The solution was prepared using a methylene chloride solvent. The solution was cast into an 108 ap (stamped "3 scrap) ignitor tablet mold and dried to provide cylindrical tablets of solid propellant 2 mm high and 5 mm in diameter.

A sample of the resulting solid propellant was fired in a closed bomb. The bomb is an 87.5 cc Model 601 impulse bomb manufactured by Techonproducts Inc. of Saratoga, Calif.

For purposes of comparison, the closed bomb test was also performed on a commercial propellant, namely double base, 25 mm BALL POWDER ® propellant. The closed bomb test results are given in TABLE I below.

TABLE I

| Physical Properties of Propellant | Closed Bomb Test Results | |
|---|---|---|
| | Present Invention | Comparison* |
| Charge weight, in kilograms | 0.012 | 0.012 |
| Maximum Pressure, in psi | 23,016 | 20,198 |
| Impetus, in joules per kilogram | 2,644,922 | 2,320,167 |
| Relative Force (RF) as a percent of Comparison | 114 | |
| Relative Quickness (RQ) as a percent of Comparison | 159 | |
| Grain Diameter, in inches | .043/.028 | .039/.034 |

*Double base 25 mm. BALL POWDER(R) propellant.

The results as presented in TABLE I above show that the propellant of the present invention provided an increased maximum pressure and impetus for an identical charge weight in the closed bomb, as compared to the double base 25 mm BALL POWDER ® propellant charge. The propellant of the present invention is considerably faster than the comparison propellant as shown by relative force and relative quickness values.

Another sample of the solid propellant prepared as described above was subjected to a hot fragment conductive ignition test. Hot fragments (i.e., steel balls having a weight of 1.25 grams) were employed to ignite the samples. The ignirion temperature was found to be 780° C., as compared to 320° C. for double base 25 mm BALL POWDER ® propellant and 780° C. for another comparison propellant consisting of an 80 percent to 20 percent by weight mixture of to cellulose acetate butyrate. The 780° C. ingnition temperature for this hot fragment test is considered excellent.

Samples of the above-described propellant made using a 50:50 weight ratio of RDX:polyurethane Polyacetal were also tested by DSC and was determined to be maximum decomposition temperature for the propellant within about the maximum decomposition temperature of RDX alone. The peak decomposition temperature for this propellant is considered excellent and compares favorably against values of 191° C. and 195° C. for prior art 50:50 propellant mixtures of RDX plus a polyurethane containing a substituted isophthalamide chain extender referred to at page 12 (Samples 21 and 22) of the above-referenced Peters et al article.

In a related experiment, a peak decomposition temperature value was measured by DSC for a 50:50 mixture of another high energy material, ammonium nitrate, and polyurethane polyacetal elastomer made in accordance with Section (IV) above. The value obtained for the peak decomposition temperature was 158° C., as compared to a value of 180° C. for ammonium nitrate alone. The 158° C. decomposition temperature is sufficiently high to be acceptable for use as a propellant.

What is claimed is:

1. An explosive or propellant composition characterized by low vulnerability to unplanned stimuli, said composition comprising between 51 and 99 weight percent of a high energy material and between 1 and 50 weight percent of a binder, said binder being a polyurethane polyacetal elastomer made by a process of:

(a) reacting a dihydroxy-terminated polyacetal homopolymer with an alkylene diisocyanate in the presence of a urethane-forming catalyst in a reaction to produce an isocyanate-terminated prepolymer, said homopolymer having a weight average molecular weight of between about 5,000 and about 60,000 as measured against a polystyrene standard by gel permeation chromatography and being produced by polymerizing a 4-lower alkyl substituted-1,3-dioxolane, said reaction employing between about 50 mole percent and about 70 mole percent of said alkylene diisocyanate based upon the total amount of said alkylene diisocyanate and said homopolymer employed, and (b) reacting said isocyanate-terminated prepolymer with a dihydroxy-terminated polyacetal copolymer in the presence of a solvent and a urethane-forming catalysr to provide a polyurethane polyacetal elastomer, said copolymer having a weight average, molecular weight of between about 10,000 and about 200,000 as measured against a polystyrene standard by gel permeation chromatography and being the reaction product of a formaldehyde-providing compound and 1,3-dioxolane, said copolymer being employed in an amount of between about 30 and about 50 mole percent based upon the total amount of said copolymer and said isocyanate-terminated prepolymer employed.

2. The composition of claim 1 which is further characterized by having a decomposition temperature peak of within about 20° C. of the decomposition temperature of said high energy material.

3. The composition of claim 2 which is further characterized by having a decomposition temperature peak of within about 5° C. of the decomposition temperature of said high energy material.

4. The composition of claim 1 wherein said high energy material is selected from the group consisting of RDX, NTO, TNT, HMX, TAGN, nitroguanidine, ammonium nitrate, diethylene glycol dinitrate, butane triol trinitrate, trimetriol trinitrate, or 2(2,4-dinitrophenoxy)ethanol.

5. The composition of claim 1 wherein the reaction of step (a) additionally employs a solvent.

6. The composition of claim 5 wherein said solvent is a halohydrocarbon.

7. The composition of claim 6 wherein said halohydrocarbon is selected from the group consisting of tetrachloroethane, chloroform, trichloroethane, and mixtures thereof.

8. The composition of claim 1 wherein said urethane-forming catalyst is dibutyltin dilaurate.

9. The composition of claim 1 wherein said urethane-forming catalyst is employed in an amount of between about 0.1 weight percent and about 5 weight percent, based on the total amount of said polyacetal homopolymer or polyacetal copolymer employed.

10. The composition of claim 1 wherein the reactions of step (a) and step (b) are individually conducted within a temperature range of between 25° C. and 90° C.

11. The composition of claim 1 wherein said steps (a) and (b) are carried out essentially simultaneously in an in situ reaction.

12. An explosive or propellant composition characterized by low vulnerability to unplanned stimuli, said composition comprising between 51 and 99 weight percent of a high energy material and between 1 and 50 weight percent of a binder, said binder being a polyurethane polyacetal elastomer made by a process of:

(a) reacting a dihydroxy-terminated polyacetal copolymer with an alkylene diisocyanate in the presence of a urethane-forming catalyst in a reaction to produce an isocyanate-terminated prepolymer, said copolymer having a weight average molecular weight of between about 10,000 and about 200,000 as measured against a polystyrene standard by gel permeation chromatography and being the reaction product of a formaldehyde-providing compound and 1,3-dioxolane, said reaction employing between about 50 mole percent and about 70 mole percent of said alkylene diisocyanate based upon the total amount of said alkylene diisocyanate and said copolymer employed, and (b) reacting said isocyanate-terminated prepolymer with a dihydroxy-terminated polyacetal homopolymer in the presence of a solvent and a urethane-forming catalyst to provide said elastomer, said homopolymer having a weight average molecular weight of between about 5,000 and about 60,000, as measured against a polystyrene standard by gel permeation chromatography and being produced by polymerizing a 4-lower alkyl substituted-1,3-dioxolane, said homopolymer being employed in an amount of between about 30 and about 50 mole percent based upon the total amount of said homopolymer and said isocyanate-terminated prepolymer employed.

13. The composition of claim 12 which is further characterized by having a decomposition temperature peak of within about 20° C. of the decomposition temperature of said high energy material.

14. The composition of claim 13 which is further characterized by having a decomposition temperature peak of within about 5° C. of the decomposition temperature of said high energy material.

15. The composition of claim 12 wherein said high energy material is selected from the group consisting of RDX, NTO, TNT, HMX, TAGN, nitroguanidine, ammonium nitrate, diethylene glycol dinitrate, butane triol trinitrate, trimetriol trinitrate, or 2(2,4-dinitrophenoxy)ethanol.

16. The composition of claim 13 wherein the reaction of step (a) additionally employs a solvent.

17. The composition of claim 16 wherein said solvent is a halohydrocarbon.

18. The composition of claim 17 wherein said halohydrocarbon is selected from the group consisting of tetrachloroethane, chloroform, trichloroethane, and mixtures thereof.

19. The composition of claim 12 wherein said urethane-forming catalyst is dibutyltin dilaurate.

20. The composition of claim 12 wherein said urethane-forming catalyst is employed in an amount of between about 0.1 weight percent and about 5 weight percent, based on the total amount of said polyacetal homopolymer or polyacetal copolymer employed.

21. The composition of claim 12 wherein the reactions of step (a) and step (b) are individually conducted within a temperature range of between 25° C. and 90° C.

22. The composition of claim 12 wherein said steps (a) and (b) are carried out essentially simultaneously in an in situ reaction.

* * * * *